Jan. 1, 1957 T. M. FERRILL, JR 2,776,099
AIR TRAFFIC CONTROL SYSTEM
Filed Jan. 5, 1953 4 Sheets-Sheet 2
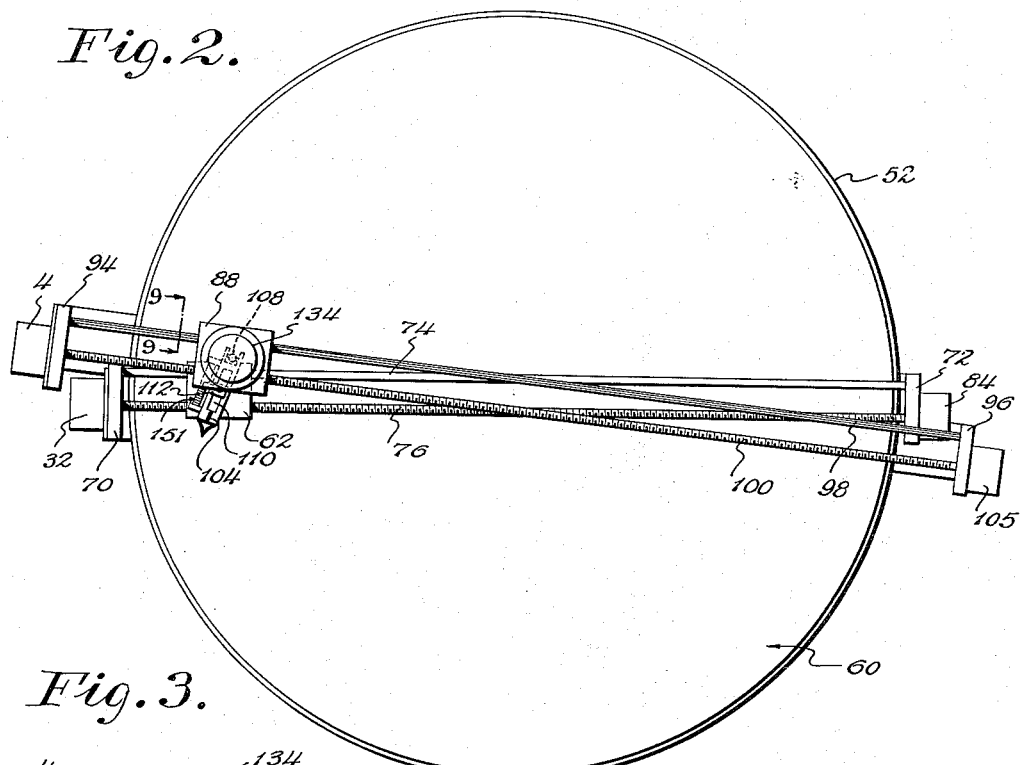
Fig. 2.
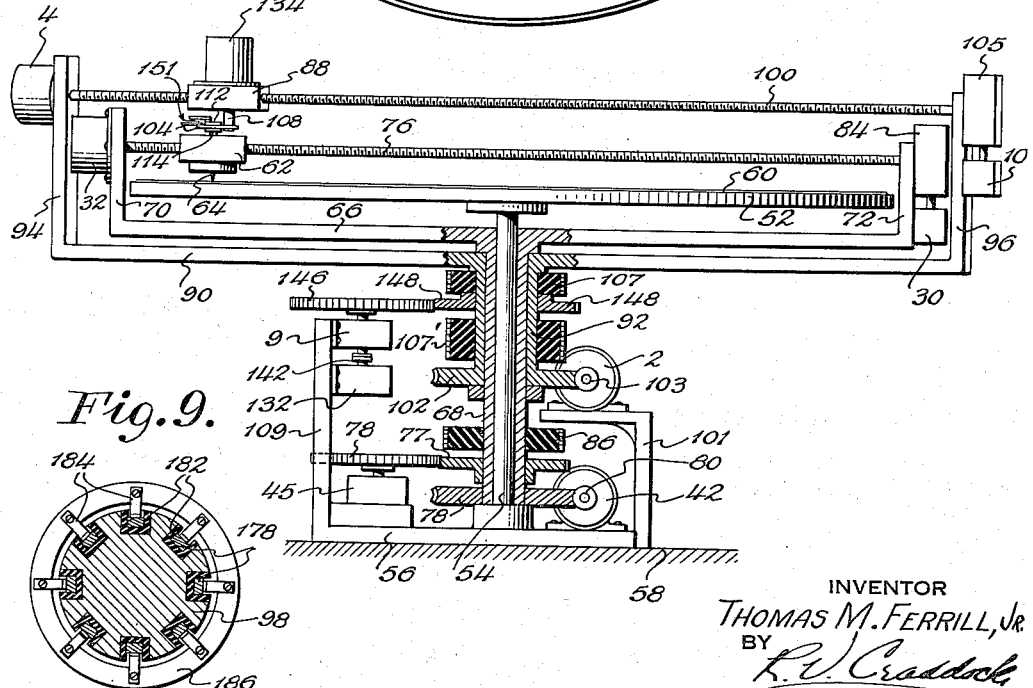
Fig. 3.
Fig. 9.
INVENTOR
THOMAS M. FERRILL, JR.
BY
ATTORNEY Jan. 1, 1957

T. M. FERRILL, JR 2,776,099

AIR TRAFFIC CONTROL SYSTEM

Filed Jan. 5, 1953

INVENTOR
THOMAS M. FERRILL, JR.
BY
ATTORNEY

United States Patent Office 2,776,099
Patented Jan. 1, 1957

2,776,099

AIR TRAFFIC CONTROL SYSTEM

Thomas M. Ferrill, Jr., Garden City, N. Y., assignor to Sperry Rand Corporation, a corporation of Delaware Application January 5, 1953, Serial No. 329,593

16 Claims. (Cl. 244—77)

This invention relates to radio flight control of aircraft and the like, and more particularly, is concerned with apparatus for automatically controlling the flight path of an aircraft to conform with a predetermined course and time program.

Various systems have heretofore been proposed for guiding aircraft or other vehicles along a predetermined course. In one known system, the proposed course is drawn as a heavy black line on a map carried by the vehicle. Photoelectric means, arranged to follow the heavy line on the map, functions through a servomechanism to guide the vehicle along the desired path. In another known flight control system, a multi-track photographic film, driven at a rate varying proportionally to the speed of the vehicle, provides information by means of associated sound-on-film type reproducers, which information is utilized to control the path of the vehicle.

Neither of these systems is particularly adapted for automatic control from information radioed or otherwise conveyed to the aircraft just prior to the period of automatic flight control. It is frequently desirable where a number of airplanes are converging on an area in the vicinity of an airport to send each aircraft information in a form which can be immediately utilized in the automatic flight control system for maintaining each of the aircraft on a predetermined course within a large area including the airport. In each of the above-described known systems, a previously prepared map or film must be carried by the aircraft, or an expensive and bulky facsimile receiving and reproducing apparatus must be carried by the plane to receive information in the form of a map with a course laid out on the map.

Another limitation of the above-described systems is that they do not provide for time programming of the aircraft operation. It is particularly desirable in traffic control that not only the course of each aircraft be controlled, but also that the position and movement of each aircraft at any given instant be established to prevent possible collision.

Still another limitation of known systems, particularly of the photoelectric follower of a course plotted on a map, is that the path cannot be made to double back on itself, that is, the path of the aircraft at one instant must not pass over a previous point on its path, such as would be encountered in a figure 8 type of configuration or where it is desirable to have the aircraft circle a predetermined number of times in its course.

It is the general object of this invention to avoid and overcome the foregoing and other limitations of and objections to the prior art practices by the provision of improved apparatus for automatically controlling the flight path of an aircraft or the like.

Another object of this invention is to provide means for controlling the aircraft in flight to a predetermined time schedule, whereby the aircraft's position at any given instant of time is pre-established.

Another object of this invention is the provision of flight control apparatus in which information defining the proposed flight path can be relayed to the craft by radio in a very short time, and just prior to the time of entering upon the controlled course.

Another object of this invention is to provide apparatus in which a visual indication of the proposed flight path is wholly reproduced on a map carried by the craft immediately prior to the programmed flight.

Another object is the provision of apparatus not only capable of controlling the aircraft according to a previously received time program record as set forth above, but alternatively capable of controlling the craft during concurrent reception of radio-transmitted signals from a remote station, either mode of operation being selectively available.

Another object of this invention is to provide a computer which continuously indicates the position of the aircraft relative to the desired position of the aircraft according to the flight program information, the computer simultaneously providing a visual indication of the plane's position, and feeding signals to the autopilot and throttle control of the aircraft for maintaining the aircraft on course and on schedule.

Another object of this invention is to provide flight control apparatus which can function to keep the aircraft circling for any predetermined number of times or which can otherwise guide the aircraft across its own path without loss of control or confusion in the automatic flight control system.

These and other objects of the invention which will become apparent as the description proceeds are achieved by the provision of a flight control system including VHF omni-directional range (VOR) and distance-measuring equipment (DME) receivers by means of which the polar coordinates of an aircraft's position relative to a ground reference point are continuously determined. A multi-channel tape recorder carried by the aircraft records information establishing a predetermined course which is reproducible in terms of the polar coordinates of a point that is changing in position with time. This information is stored on the tape as alternating voltage signals, the instantaneous phase relation between the signals and a reference signal being indicative of the instantaneous radial distance and azimuth angle of an aircraft following the predetermined course. The information from the recorder when the tape recording is played back at a predetermined speed is compared in a computer with information regarding the aircraft's actual position as determined from the VOR and DME receivers. The computer visually indicates the position of the plane and a point a predetermined distance ahead of the point on the course where the aircraft is supposed to be according to the tape recording information. In addition the computer develops error signals indicative of the off-course error and time lag in the plane's actual position from the course position established by the recorder, and feeds these error signals to the autopilot and throttle control respectively to bring the actual position and desired position into substantial coincidence to maintain the aircraft on course and on schedule.

For a better understanding of the invention, reference should be had to the accompanying drawings, wherein:

Fig. 2 is a plan view of the computer and course plotter shown in block form in Fig. 1;

Fig. 3 is an elevation, partially in section, of the computer and course plotter of Fig. 2;

Fig. 8 is a schematic view of a phase shifter; and

Fig. 9 is an enlarged fragmentary cross-sectional view taken on the line 9—9 of Fig. 2.

Figure 1:
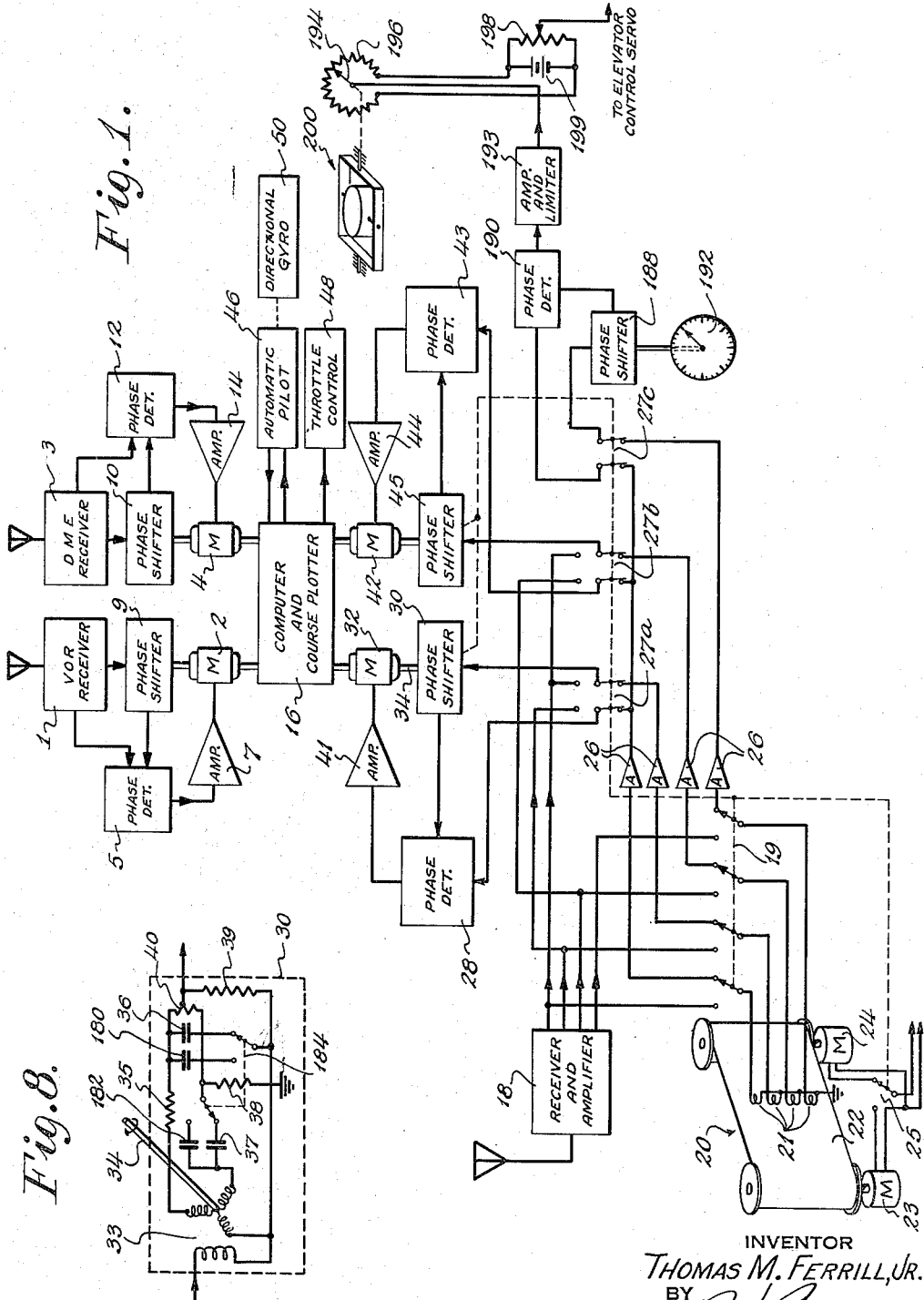
Fig. 1 is a block diagram showing the essential components of the present invention.

Referring to Fig. 1 of the drawings, the numeral 1 indicates a VHF omni-directional range (VOR) receiver which is carried by an aircraft or other vehicle the course of which is to be controlled. The receiver 1, by means of information transmitted from a fixed ground station (not shown), controls a motor 2, the angular position of the motor shaft being indicative of the instantaneous azimuth angle of the aircraft relative to the ground station. Similarly, a distance-measuring equipment (DME) receiver 3, by means of information relayed from the fixed ground station, controls a motor 4, the angular position of the motor shaft being indicative of the instantaneous straight line distance of the aircraft from the ground station. Such position indicating equipment is described in more detail in application, S. N. 195,761, filed on November 15, 1950, by George B. Litchford, now Patent No. 2,705,793 issued April 5, 1955.

The motor 2 is driven by a D.-C. signal derived from a phase detector 5 through an amplifier 7. A phase shifter 9 is mechanically controlled by the motor 2 so as to shift the phase of a reference signal derived from the receiver 1. The output signal of the phase shifter 9 is compared with a phase reference signal from the receiver 1 in a phase detector 5, the D.-C. output of the phase detector 5 varying in potential with changes in the phase relationship of the input signals in a conventional manner. The motor 4 is similarly controlled from the DME receiver 3 by means of a phase shifter 10 and phase detector 12 through an amplifier 14.

The output shafts of the motors 2 and 4 are coupled mechanically to a computer and course plotter, indicated schematically at 16, the construction and operation of which will hereinafter be described. The computer 16 provides a visual indication by means of a plotting element, the polar coordinates of which are controlled so as to continuously position the plotting element on a polar map of the terrain over which the aircraft is flying in scalar correspondence to the actual position of the aircraft.

Information as to the desired course which the aircraft is to follow is relayed to the aircraft by radio, a receiver 18 being provided for this purpose. The received signal is modulated by plural sub-carriers of different predetermined frequencies, each of the sub-carriers being modulated by an audio sine wave signal. The relative phase of each of the second, third and fourth of these sine wave signals with respect to a reference phase signal (the first of the sine wave signals) is indicative respectively of radial distance, azimuth angle, and other information, such as altitude, as may be desirable. Thus the output of the receiver 18 comprises at least three audio signals of the same frequency. One of the output signals is provided as a phase reference. Another of the output signals is provided to supply radial distance informational and a third output signal is provided to supply azimuth angle information. A fourth output signal from the receiver 18 supplies information as to altitude.

These signals are fed to a multi-channel tape recorder, indicated at 20, where they may be individually recorded for future reference. Each of the output signals from the receiver 18 is connected by means of a four-pole double-throw switch 19 to the record-playback head of a tape recorder 20.

The tape recorder 20 may be of any well-known type having a plurality of separate record-playback coils 21 by means of which the several output signals from the receiver 18 may be simultaneously recorded in respective separate tracks on the recording tape 22. The recorder 20 is provided with drive means including motors 23 and 24 for driving the tape in opposite directions. For reasons which will hereinafter become apparent the motor 23 drives the tape 22 during the recording of incoming signals from the receiver 18 at preferably ten times the speed at which the motor 24 drives the tape 22 during playback. A reversing switch 25 connects one or the other of the drive motors to a source of electrical power (not shown). A suitable playback tape speed is 7½ inches per second with a corresponding recording tape speed of 75 inches per second. Speed of the motors can be accurately regulated by well-known means such as a mechanical governor or crystal-control A.-C. power source in conjunction with synchronous motors.

Signals derived either from the tape 22 or directly from the receiver are utilized to operate the computer and course plotter 16 over a scalar representation of the course along which it is desired that the aircraft fly. Assuming that information as to the desired course has been recorded on the tape 22, the switch 19 is set to connect the respective signals derived from the tape by the record-playback coils 21 to suitable playback amplifiers 26. The amplified phase reference signal is then connected by means of a double-throw double-pole switch 27a (in the position shown in Fig. 1) to a phase detector 28. The amplified radial distance signal derived from the tape 22 is connected by means of the switch 27a to a variable phase shifter 30, which is mechanically actuated by a motor 32.

The phase shifter 30 is preferably of the type shown in Fig. 8 and described in detail in application S. N. 729,852, filed February 20, 1947, by J. E. Browder and V. J. Young, now Patent No. 2,627,598 issued February 3, 1953, and includes a synchro unit 33 which is mechanically rotated by means of a shaft 34. A resistor 35 and capacitor 36 are connected in series to provide a phase shifter network connected across one pair of windings of the Y-connected rotor of the synchro 33, and a capacitor 37 and resistor 38 are connected in series to provide a second phase shifter network connected across a second pair of windings of the rotor. The input signal is applied across the single winding of the stator of the synchro 33 and the output signal is taken across a resistor 39 between the center point of a resistor 40 and ground, the resistor 40 having very much higher resistance than resistors 35 and 38. The resistor 40 is connected between the resistor-capacitor junctions of the phase shifter networks. Rotation of the shaft 34 shifts the phase of the output signal with respect to the input signal uniformly in proportion to the angle of rotation of the shaft. Since the phase shifter 30 has been particularly described, it will be realized that the same or any desired type may be used throughout the present invention where mechanically actuated phase shifters are used.

The output signal from the phase shifter 30 is compared with the reference signal from the recorder 20 in the phase detector 28. The phase detector 28 produces a D.-C. output signal the magnitude of which varies with changes in relative phase angle between the phase shifter output signal and the reference signal, and the polarity of which is reversible as the magnitude passes through zero.

The D.-C. output of the phase detector 28 is amplified by a D.-C. amplifier 41 and applied to the motor 32, the motor 32 being of a permanent field or a separately excited field type so that its direction of rotation is determined by the polarity of the signal from the amplifier 41. The motor 32 rotates the phase shifter 30 in response to the output of the phase detector until the phase of the output of the phase shifter is such as to reduce the output of the phase detector 28 to zero. It will be recognized that a closed-loop servo system is thus provided in which the angular position of the output shaft of the motor 32 is made to change in proportion to variations in the relative phase angle between the reference signal and the radial distance signal from the recorder 20.

Similarly, a motor 42 is controlled by a phase detector 43 and amplifier 44 in response to the relative phase angle between the reference signal and the azimuth angle signal derived from the recorder 20 through an amplifier 26 and connected through a switch 27b. A phase shifter 45 driven by the motor 42 reduces the output of the phase detector 43 to zero when the angular position of the motor shaft corresponds with the desired azimuth angle. The motors 32 and 42 are thereby continuously controlled in response to information stored on the tape recorder 20 and are indicative of the radial distance and azimuth angle respectively as a function of time for a predetermined flight path. This information is mechanically supplied by means of the motors 32 and 42 in the computer and course plotter 16, where the desired position in terms of radial distance and azimuth angle at any given instant is compared with the actual craft position in radial distance and azimuth angle from the VOR–DME station at that instant. Such information is utilized in the computer 16 to plot the desired course of the aircraft and also to control the actual flight path of the aircraft through the autopilot servo, indicated generally at 46, and throttle control, indicated at 48. A directional gyro 50 provides information as to the aircraft's actual heading as a reference for the autopilot 46 in a manner to be hereinafter described.

Figure 4:
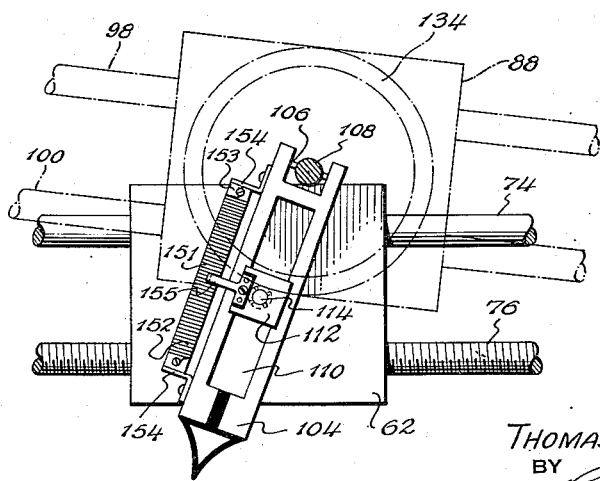
Fig. 4 is an enlarged fragmentary sectional view showing details of a portion of the computer and course plotter of Fig. 2.

The computer and course plotter 16, shown in detail in Figs. 2, 3 and 4, includes a circular map table 52 centrally supported by a rod 54 secured by means of a flange support 56 to the frame of the aircraft, indicated generally at 58. A map 60 is spread on the surface of the map table, the map 60 being a polar coordinate plot of the terrain over which the aircraft is to fly, with the center of the map corresponding to the actual position of the VOR and DME ground station.

A recording element 62, positioned above the map 60, is provided with a recording stylus 64 which is normally in contact with the map surface. The recording element 62 is supported for movement both radially and arcuately relative to the map 60. To this end, a bracket 66 rotatably supported by means of a sleeve portion 68 journalled on the supporting shaft 54 is provided, the bracket 66 having outer end portions 70 and 72 which project upwardly above the level of the surface of the map 60. A pair of parallel rods 74 and 76 span the distance across the space above the map 60 and are supported at their respective ends by the end portions 70 and 72. The rod 74 slidably engages a bore through the recording element 62, while the rod 76 threadedly engages the recording element 62. Thus, rotation of the rod 76 moves the recording element 62 radially along the rod 74, the two rods cooperating to support the recording element 62 and to impart arcuate movement thereto about the center of the map with rotation of the bracket member 66 about the supporting rod 54.

Radial movement of the recording element 62 is effected by means of the motor 32 which is controlled from the tape recorder in the manner as above described. Arcuate movement of the recording element 62 is effected by means of the motor 42 through a suitable drive including a worm wheel 78 secured to the sleeve 68 and an engaging worm 80 on the shaft of the motor 42. Motors 32 and 42 preferably each include internal speed-reduction gears. Rotation of the motors 32 and 42 in response to the information reproduced from the tape recorder 20 results in movement of the recording element 62 across the surface of the map 60, the recording element 62 scalarly tracing out on the surface of the map the desired flight path over which the aircraft is to fly.

The other end of the rod 76 opposite that of the motor 32 is connected through a speed reducer 84 to the mechanically actuated phase shifter 30 which, for convenience, is mounted on the portion 72 of the bracket 66. Electrical connections for the motor 32 and phase shifter 30 may be made through a suitable slip ring rotor 86 carried on the sleeve 68 and suitable fixed brushes (not shown). The phase shifter 45 is mounted on the support 56 with the shaft thereof geared by means of spur gears 77 and 78 to the sleeve 68, one complete rotation of the sleeve 68 by the motor 42 effecting one complete revolution of the phase shifter 45.

A second element to be driven in scalar correspondence to the actual position of the aircraft is similarly mounted for movement over the surface of the map 60. The second element, hereinafter referred to as the radio controlled element 88, is supported for movement both radially and arcuately relative to the map 60 by means of a bracket 90 which in turn is rotatably supported by means of a sleeve portion 92 journalled on the outer surface of the sleeve 68. The bracket 90 has outer end portions 94 and 96 which project upwardly above the level of the surface of the map 60 and higher than the end portions 70 and 72 of the bracket 66.

A pair of parallel rods 98 and 100 span the distance across the map 60 and are supported above the rods 74 and 76 at their respective ends by the end portions 94 and 96. The rod 98 slidably engages a bore through the radio controlled element 88, while the rod 100 threadedly engages the radio controlled element 88 for imparting radial movement thereto.

The rod 100 is rotated by the motor 4 which in turn is actuated in response to radial distance information supplied by the DME receiver 3. Arcuate movement of the radio controlled element 88 from information supplied by the VOR receiver 1 is effected by means of the motor 2 through a suitable drive including a worm wheel 102 secured to the sleeve 92 and an engaging worm 103 on the shaft of the motor 2. The motor 2 is supported from the support 56 by a suitable bracket 101. Rotation of the motors 2 and 4 in response to the information received by the receivers 1 and 3 respectively results in movement of the radio controlled element 88 across the surface of the map 60, the position of element 88 projected on the map 60 being scalarly indicative of the actual position of the aircraft at any given instant of time in relation to the fixed ground station.

The other end of the rod 100 opposite that of the motor 4 is connected through a speed reducer 105 to the mechanically actuated phase shifter 10, which is mounted on the portion 96 of the bracket 90. Electrical connections for the motor 4 and phase shifter 10 may be made through a suitable slip ring rotor 107 carried on the sleeve 92 and fixed brushes (not shown). The phase shifter 9 is mounted on a bracket 109 with the shaft thereof geared by means of spur gears 146 and 148 to the sleeve 92, the spur gears having a one-to-one gear ratio.

While conceivably it would be possible for a pilot to fly the airplane so as to maintain coincidence between the radio controlled element 88 and the tape controlled element 62 and thereby pursue the desired flight path as derived from the tape recorder, it is preferable to automatically control the aircraft in its flight and thereby relieve the pilot of an arduous task and at the same time obtain the smoothness and accuracy of flight inherent in automatic control. To this end, link 104 is pivotally connected to the radio controlled element 88, as by a pin 106 hingedly securing the link to a rotatable shaft 108. See particularly Fig. 4. The link 104 is provided with a longitudinal slot 110 which serves as a guide for a sliding block 112. A snap plug 114 projecting above the tape controlled element 62 pivotally engages a hole in the block 112 so that the link 104 is maintained with its longitudinal axis passing through the centers of the elements 62 and 88 in a plane substantially parallel to the map 60.

Figure 7:
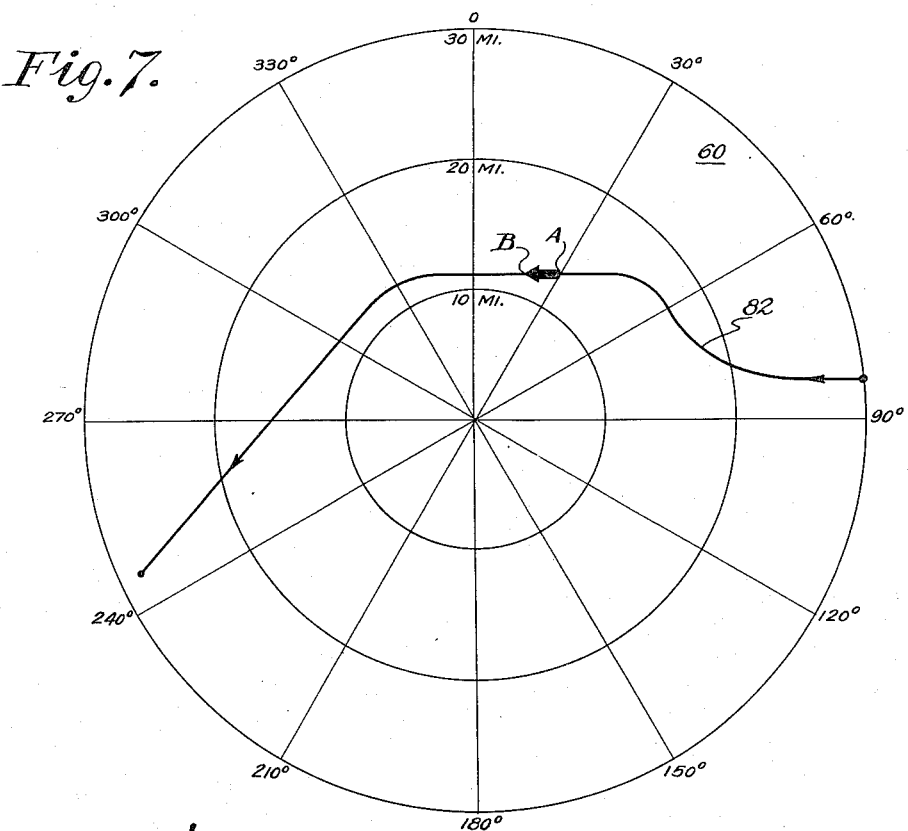
Fig. 7 is a view of a polar coordinate map on which is drawn an illustrative flight path as recorded by the computer and course plotter.

It will be seen that the direction in which the link 104 points is the direction in which the aircraft must head to maintain the aircraft on course. Thus, referring to Fig. 7, if point A represents the actual position of the aircraft as determined by the center of the radio controlled element 88 projected on the map 60, and point B represents the position of the center of the tape controlled element 62 projected on the map 60, and the point B is being moved along the course 82 by signals from the tape recorder 20, the point A, in response to movement of the aircraft, must move in the direction of the vector joining points A and B for the aircraft to follow along the proper flight path. The direction of the vector AB is indicative of the required heading of the aircraft and the length of the vector AB is indicative of the desired speed of the aircraft. If point A moves to the right or to the left of the plotted course, the vector is accordingly rotated, indicating a necessary change in the aircraft's heading. An asymptotic return to substantial conformity of the craft travel with the signalled course then ensues, the heading angle with respect to the course being gradually reduced as the craft approaches the course. If the point A, representing the position of the aircraft, drops back relative to point B, the vector AB becomes longer, indicating that the air speed of the aircraft should be greater to reduce the distance between the desired position and actual position of the craft.

The heading of the aircraft is controlled through the autopilot servo 46 in which the desired heading as indicated by the link 104 is compared with the actual heading of the aircraft as indicated by the directional gyro 50. An error signal is developed which operates the control surfaces of the aircraft through an autopilot control unit 113 to bring the actual heading into correspondence with the desired heading.

Figure 5:
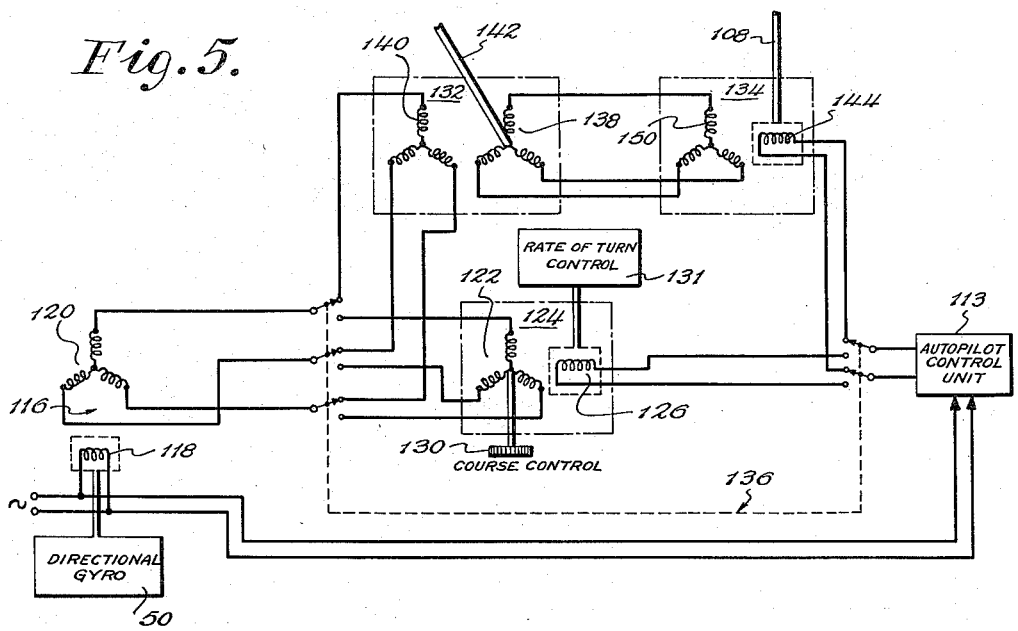
Fig. 5 is a schematic view of the servo control circuit used in controlling the course of an aircraft in response to the computer.

The schematic diagram of Fig. 5 shows a standard autopilot system as described in detail in Patent No. 2,539,411 and which includes a synchro generator 116 having a rotor 118 that is fixed in space relative to true north by the directional gyro 50 to which it is mechanically coupled. The Y-connected stator 120 is normally connected to the stator 122 of a synchro transformer 124. The output of the rotor 126 of the synchro transformer 124 is fed to the autopilot control unit 113 which compares the phase of the output of the rotor 126 with the input to the rotor 118, the control unit 113 turning the airplane to the left or right depending on whether the output signal is in phase or 180° out of phase with the input signal. Since the rotor 118 is fixed by the directional gyro, change in heading of the aircraft results in relative rotation between the rotor 118 and stator 120. Depending on the relative angular position fixed between the stator 122 and rotor 126 by the course control knob 130, the aircraft is turned by the control unit 113 to the selected heading, the rotor 118 and stator 120 being thereby positioned so as to reduce the output at the rotor 126 to zero. A rate of turn control 131 is generally included for enabling the operator to rotate the rotor 126 at a pre-set rate so as to limit the maximum output signal developed and thereby limit the maximum rate of turn of the aircraft for large changes in heading.

To operate the aircraft automatically from the computer and course plotter 16, a differential synchro 132 and synchro transformer 134 are connected into the autopilot by a switch 136 in place of the synchro transformer 124. The synchro transformer 134 is mounted on the radio controlled element 88 of the computer 16, the shaft 108 being connected to the rotor 144 of the synchro transformer 134 so as to impart relative movement between the rotor 144 and stator 150 of the synchro transformer 134 in response to a change in angle (see Figs. 2, 4 and 7) between the link 104 and the rod 98. The differential synchro 132 is mounted on the bracket 109, a shaft 142 coupling the rotor 138 of the differential synchro 132 to the shaft of the phase shifter 9 so as to be rotated by rotation of the sleeve portion 92. One complete revolution of the bracket 90 effects a complete revolution of the rotor 138 relative to the stator 140 of the differential synchro 132.

The synchro generator 116, the differential synchro 132, and the synchro transformer 134 combine to produce an output signal at the rotor winding 144 of the synchro transformer 134 when the heading of the aircraft as derived from the directional gyro 50 differs from the desired heading as derived from the link 104. This error signal varies in magnitude with off-course movement of the aircraft, the phase of the error signal shifting 180° as it passes through zero. The autopilot control unit 113 operates in response to this error signal in a conventional manner to bring the aircraft back on course and maintain the desired heading.

A significant feature of the present invention is that the computer 16 not only controls the flight path of the aircraft from the tape recorder 20, but the computer also controls the time programing of the aircraft's flight. The rate at which the recording element 62 is moved across the map 60 under control of the signals being reproduced from the constant-speed tape is utilized to control the speed of the aircraft. To this end, a control for throttling the aircraft is provided, the throttle control comprising a potentiometer, indicated at 151 (Fig. 4), mounted on the link 104. The potentiometer includes a wire resistor 152 wound on a strip of insulation 153 which is supported along one side of the link 104 by means of suitable brackets 154. A sliding contact arm 155 is mounted on the block 112 but electrically insulated therefrom.

Figure 6:
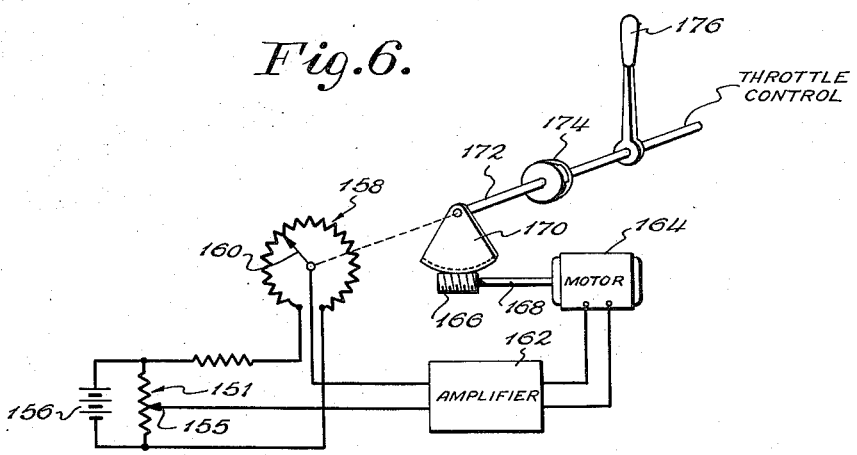
Fig. 6 is a schematic view of the servo system for controlling the engine throttle in response to the computer.

Referring to Fig. 6, the potentiometer 151 is connected across a source of potential 156. A second potentiometer 158 is connected across the same source of potential. The potential difference between the sliding contact 160 of the potentiometer 158 and the sliding contact 155 is amplified by a suitable D. C. amplifier 162 and applied to a D. C. motor 164 having a permanent or separately excited field. A worm 166 on the shaft 168 of the motor 164 engages a worm gear segment 170 carried by the shaft 172. As in the previous motors, reduction gearing is preferably provided in motor 164. By mechanically coupling the sliding contact 160 of the potentiometer 158 to the shaft 172, rotation of the motor 164 is made to position the sliding contact 160 so as to reduce the potential difference between the sliding contact 160 and sliding contact 155 to zero. Thus, movement of the sliding contact 155 results in a corresponding change in the angular position of the shaft 172. Coupled to the shaft 172 by means of a suitable positive engaging clutch 174 is the engine throttle control of the aircraft, which includes a throttle lever 176. Thus, with the clutch 174 in engaged position, the motor 164 actuates the throttle control in response to the position of the sliding contact 155.

Referring to Fig. 9, the various connections to the synchro transformer 134 and the potentiometer 158 are made by means of conductive strips 178 recessed in grooves 180 formed longitudinally and spaced around the circumference of the rod 98. The conductive strips 178 are secured in the grooves 180 by channel-shaped insulators 182. A plurality of spring fingers 184 are secured to a ring 186 of insulating material mounted on the element 88, the ring and contacts being positioned and spaced to provide continuous wiping contact between the conductive strips 178 and spring fingers 184 as the element 88 is moved radially along the rod 98. A slip ring rotor 107' on the sleeve 92 provides means for making rotary electrical connections to the conductive strips.

The throttle control is adjusted to maintain the air speed of the aircraft at an average flight velocity between stalling speed and full throttle speed, e. g., 160 miles per hour air speed, when the sliding contact 155 as controlled by the position of the block 112 is substantially in the middle of the extent of its travel.

If the forward speed of the tape controlled element corresponds to a ground speed of 160 miles per hour for example, then if there is no head wind or tail wind so that the air and ground speeds are the same, the sliding contact 154 maintains a center position along the potentiometer and the aircraft maintains the desired ground speed set by the tape. If a head wind is present, the aircraft's ground speed is reduced accordingly, resulting in a gradual falling behind of the plane's actual position relative to the desired position established by the tape. This changes the relative positions of the radio controlled element 88 and tape controlled element 62, with increased distance therebetween, the sliding contact 155 being moved accordingly from its normal center position and thereby effecting an increase in the air speed of the aircraft through the throttle control so as to maintain the ground speed at the desired 160 miles per hour. A tail wind similarly effects a reduction in air speed through the throttle control to maintain the desired ground speed as established by the tape.

In addition to controlling the flight path of the aircraft, the altitude may be also controlled automatically. As shown in Fig. 1, a fourth control signal is provided by the receiver 18 which may be recorded and played back by the recorder 20. During playback the altitude signal, after amplification, is connected by a switch 27c to a phase shifter 188. The output of the phase shifter is compared with the reference signal from the recorder 20 in a phase detector 190. An altimeter 192 mechanically actuates the phase shifter 188 so that if the airplane is at the desired altitude, as measured by the altimeter, the output of the phase detector 190 is zero. Any change in the altitude of the aircraft results in a rotation of the phase shifter 188 with a corresponding output error signal from the phase detector 190. The output of the phase detector 190 is amplified by an amplifier and limiter 193. The signal is limited to prevent too sudden or large demands being made on the autopilot in correcting the altitude of the aircraft.

The amplified output of the phase detector is connected to the sliding contact 194 of a potentiometer 196 that is part of a bridge circuit which includes a second potentiometer 198 connected across a D.-C. potential 199. The sliding contact 194 is coupled to a gyro vertical indicated generally at 200. Any change of pitch in the airplane's attitude shifts the sliding contact 194 and unbalances the bridge. The signal developed across the bridge circuit adds to the signal from the phase detector to control the elevator control servo (not shown) of the aircraft. Any change in altitude from the desired altitude established by information recorded on the tape, as well as any change in attitude of the aircraft from that set by the potentiometer 198 thereby produces a corrective adjustment through the elevation control servo.

The tape recorded flight information may be utilized to control the aircraft in several ways. For example, a tape recording of the desired flight path may be carried on the aircraft as part of a library of recordings which may be selected in conformance with instructions relayed to the craft from the ground. Another arrangement is to use a tape recorder-reproducer at the aircraft control station, using a pre-selected tape recording and relaying via radio the signals reproduced therefrom to control the aircraft directly from the ground, the output from the aircraft radio receiver 18 being used immediately to control the element 62 of the computer 16 on the aircraft. For such operation, the four outputs of receiver 18 are connected directly to the inputs of the respective amplifiers 26, and the recorder-reproducer means 20 is disconnected therefrom. Selector switch means may be employed for this purpose if desired.

Still another and preferred type of operation is the use of the tape recorder in the aircraft to record a substantial duplicate of the tape at the control station, relying upon the signals transmitted from the control station via radio. For this purpose, the tape information relayed by radio is played at a predetermined abnormally high speed and in reverse order. This information as received is recorded on the aircraft tape recorder 20 at a corresponding high speed by running the tape backward at the predetermined high linear velocity. This type of operation is accomplished by setting switch 19 in the record position. The motor reversing switch 25 is ganged to the switch 19 so as to energize motor 23 to record the incoming signals from the receiver 18 at high tape speed. The switches 27a and 27b are set to the upper position shown in Fig. 1, to operate tape controlled element 62 of the computer and course plotter 16 by means of motors 32 and 42 directly from the output signals from the receiver 18 at the same time they are being recorded. With the link 104 disconnected from the element 62, the latter traces out the flight path in the reverse direction from the intended flight course (i. e., from the point of departure to the point of entry upon the programmed flight), and at the accelerated rate.

It should be noted that the flight information as received in this mode of operation of the system is at ten times the normal frequency, and the phase relations of the azimuth and radial distance signals relative to the reference signals are reversed, that is, the phase relation of each is changed from that of a normal phase lead to a phase lag of the same magnitude angle, or vice versa. The only components of the control of the motors 32 and 42 normally adversely affected by the increase in frequency during the high speed recording cycle are the phase shifters 30 and 45. For this reason, condensers 36 and 37 are disconnected and condensers 180 and 182 having one-tenth the capacity are connected in by means of a switch 184 in the phase shifter circuit. See Fig. 8. The reversal in relative phase is taken care of by connecting in the switches 27a and 27b in such a manner that the reference signal and the control signal (whether it be the azimuth angle or radial distance signal) be interchanged as between the inputs to the corresponding phase shifter and phase detector. Thus, where the reference signal during normal low speed operation as played back from the tape is connected to the phase detectors 28 and 43, in the high speed recording operation, the reference signal is fed to the phase shifters 30 and 45.

The flight path 82 may be recorded in reverse just prior to the time the aircraft goes into automatic flight control. By recording the flight information in reverse on the tape, and rendering the servo control mechanism for element 62 operative during this recording step, the tape controlled element 62 is made to trace out the flight path in the reverse direction and at an accelerated rate, plotting it on the map 60 by means of stylus 64, and to approach scalar coincidence with the actual position of the aircraft, as indicated by the radio controlled element 88, as the aircraft reaches the region of commencement of automatic flight control. The link 104 is then engaged when the aircraft and recorder have brought the elements 88 and 62 into proximity. This is accomplished simply by manually engaging the socket of block 112 with the plug end of the pin 114. Switches 19, 25, 27 and 184 (which may be ganged together) are then thrown to their reverse positions, whereby the tape recorder 20 is reversed and operated at the predetermined relatively low speed which establishes the program timing basis, and the servo drive for element 62 is connected to the tape recorder-reproducer means 20.

The computer 16 is connected into the autopilot by means of the switch 136 (Fig. 5), and the throttle control clutch 174 (Fig. 6) is engaged to complete the conditions for automatic flight.

It will be appreciated that in calm or moderate wind conditions, the craft will be made to travel in such a way that its scalar position over map 60, as represented at all times during the programmed flight by the position of element 88, will be directly behind element 62 by the distance corresponding to the mid-position of contact 155 on potentiometer resistor 151 (Figs. 2 and 4). The recorded program of flight control data signals is based upon this relationship between the elements 62 and 88.

In the event of a strong head wind, element 88 lags somewhat farther behind element 62 by such an extent that it brings about an appreciably advanced throttle setting for greater engine power and air speed sufficient to hold the ground speed required by the program of the recorded signals. A very slight positional lag error is thus introduced so long as the flight direction is into the wind. In the event of a strong tail wind, the converse conditions apply, with element 88, scalarly representing the craft position, following element 62 more closely than the normal distance therebetween, with reduced engine power and air speed, and with a slight positional lead error.

In case of a cross wind from starboard, the craft tends to deviate to the left from the prescribed course, with attendant gradual departure of element 88 to the left from the track plotted during the previous accelerated recording step. As a result of such departure, the direction of the vector link 104 is gradually angularly shifted in the clockwise direction as viewed in Fig. 2, and corrective action of the autopilot means of Fig. 5 results, the craft heading being changed in the clockwise sense along with the change of the vector direction to the extent that the necessary "crab" angle is established for progress of the craft parallel to the prescribed course, with slight lateral displacement error to the left from the course.

The ground speeds for which the records are prepared are selected in a range well above stalling speeds and well below maximum air speeds of the types of aircraft to be controlled. This allows for holding to the prescribed operating programs, with the greater or lower air speeds necessary during strong wind conditions.

The master records to be available at the control station may be prepared by plotting the various desired local flight plans and operating plural phase shifters according to successive values of radial distance and azimuth angle and altitude along points of the plotted course spaced at equal incremental time spacings therealong, the reference phase signal and the several variable phase signals being recorded during this process. Alternatively, the master records may be produced during actual flights, employing phase shifters driven according to azimuth angle and radial distance by a VOR–DME plotter, in the manner of phase shifters 9 and 10, Fig. 3, and a phase shifter driven by the altimeter, similar to elements 188 and 192 in Fig. 1.

Since the operation of the aircraft is regulated as to time and position with respect to its travel over a predetermined geographical area, the operator in the fixed control station, by selection of the appropriate path record and by timing the craft's commencement of flight under control thereof, has full and definite information as to the positions to be occupied by the craft at all times thereafter, within the control area. Hence, the programming of paths for multiple aircraft may be accomplished with reasonably accurate prediction of their relative positions and directions, and hence with increased operating safety.

From the above description it will be recognized that the various objects of the invention have been achieved by the provision of apparatus which can automatically control the flight path as well as the flight speed of an aircraft in response to information recorded on a magnetic tape. The apparatus can be adopted into a standard autopilot. The apparatus provides a visual indication of the proposed flight path as well as a continuous indication of the aircraft's position relative to that flight path. In addition, automatic altitude control is provided in the system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Craft control apparatus for simultaneously receiving, recording, and plotting transmitted course data in the form of multiple A.-C. signals at high speed and thereafter automatically guiding the craft from the course data reproduced at low speed, said apparatus comprising multisignal recording and reproducing means including a recording medium, transducer means operatively associated with the recording medium, and means for driving the recording medium at a predetermined high speed relative to the transducer means in one direction during recording of input signals and for driving the recording medium at a predetermined low speed relative to the transducer means in the opposite direction during reproduction of the recorded signals whereby the recording and reproducing means reproduces a lower frequency version of the recorded signals; means for supplying multiple A.-C. course data signals to the recording and reproducing means; course plotting means including a course tracing element universally movable in a plane over a predetermined area according to first and second coordinates of position, first servo means for controlling the position of the tracing element with respect to the first coordinate of position, and second servo means for controlling the position of the tracing element with respect to the second coordinate of position, the first and second servo means being coupled to the output of the recording and reproducing means, the first servo means being responsive to at least one of the reproduced A.-C. course data signals and the second servo means being responsive to at least another of the reproduced A.-C. course data signals; craft position indicating means including an indicating element universally movable in a plane parallel to the plane of movement of the course tracing element and means for varying the position of the indicating element scalarly according to variations of position of the craft; means including an extensible link extending between the course tracing element and the position indicating element for varying the direction and speed of the craft according respectively to the vector direction and the length of the link; and means including the first and second servo means for varying the position of the course tracing element in direct response to the multiple signals from said course data signal supplying means during the recording of the course data signals.

2. Apparatus as defined in claim 1 wherein the course data signals include a phase reference signal and at least two variable phase signals, and said first and second servo means include means for comparing the phase displacement between the reference signal and the respective variable phase signals, the first servo means being responsive to the difference in phase between the reference signal and one of the variable phase signals and the second servo means being responsive to the difference in phase between the reference signal and another of the variable phase signals.

3. Apparatus as defined in claim 1 wherein said means for varying the direction and speed of the craft further includes directional reference means, synchro means actuated by the directional reference means and rotation of the link, the synchro means providing an error signal indicative of the difference in actual heading of the craft as determined by the directional reference means and the desired heading of the craft as determined by the direction of the link, and servo means responsive to the error signal from the synchro means for correcting the heading of the craft to conform with the heading indicated by the link.

4. Apparatus as defined in claim 3 wherein said means for varying the direction and speed of the craft further includes a potentiometer associated with the link, the sliding contact of the potentiometer being actuated by relative movement of said elements toward or away from each other, a source of potential connected across the potentiometer, and servo means for correcting the speed of the craft coupled to the sliding contact of the potentiometer and responsive to the changes in potential across one leg of the potentiometer.

5. Apparatus as defined in claim 1 further comprising altitude control means including an altimeter, means coupled thereto for producing an output signal indicative of altitude, and servo means responsive to the output from said altimeter means and at least one of the reproduced A.-C. course data signals from the recording and reproducing means, the servo means correcting the altitude of the craft in response to the difference in indicated altitude and desired altitude.

6. In a craft guidance system, a navigation table carried by the craft, a first element universally supported for movement over the extent of the table according to a first coordinate and a second coordinate of position, a second element universally supported for movement over the extent of the table according to a first coordinate and a second coordinate of position, means including position determining apparatus carried by the craft for varying the position of said first element scalarly over the navigation table with changes in position of the craft, recording means having recorded thereon a reference A.-C. signal and first and second variable phase A.-C. signals, means responsive to the difference in phase at any instant between the reference signal and each of said first and second signals for positioning said second element, the respective phase differences defining said first and second coordinates of position of the second element, link means extending from one of said elements to the other of said elements, means for varying the heading of the craft in accordance with changes of orientation of said link means relative to the navigation table, and means for varying the speed of the craft according to variations of length along the link means between said first and second elements.

7. In a craft guidance system, a navigation table carried by the craft, a first element universally supported for movement over the extent of the table according to a first coordinate and a second coordinate of position, a second element universally supported for movement over the extent of the table according to a first coordinate and a second coordinate of position, means carried by the craft for varying the position of said first element scalarly over the navigation table with changes in position of the craft, means for moving said second element over the navigation table, link means extending from one element to the other, means for varying the heading of the craft in accordance with changes of direction of said link means, and means for varying the speed of the craft according to variations of length along the link means between said first and second elements.

8. In a craft guidance system, a navigation table carried by the craft, a first element universally supported for movement over the extent of the table according to a first coordinate and a second coordinate of position, a second element universally supported for movement over the extent of the table according to a first coordinate and a second coordinate of position, means carried by the craft for varying the position of said first element scalarly over the navigation table with changes in position of the craft, recording means having recorded thereon a reference A.-C. signal and first and second variable phase A.-C. signals, means responsive to the difference in phase at any instant between the reference signal and each of said first and second signals for positioning said second element, the respective phase differences defining said first and second coordinates of position of the second element, link means extending from one element to the other, and means for varying the heading of the craft in accordance with changes of direction of said link means.

9. In a craft guidance system, a navigation table carried by the craft, a first element universally supported for movement over the extent of the table according to a first coordinate and a second coordinate of position, a second element universally supported for movement over the extent of the table according to a first coordinate and a second coordinate of position, means carried by the craft for varying the position of said first element scalarly over the navigation table with changes in position of the craft, recording means having recorded thereon predetermined flight path information, means responsive to said recording means for positioning said second element, the recorded information defining respectively said first and second coordinates of position of the second element, link means extending from one element to the other, and means for varying the heading of the craft in accordance with changes of direction of said link means.

10. In a craft guidance system, navigational apparatus including a first element universally supported for movement according to a first coordinate and a second coordinate of position relative to the craft, a second element universally supported for movement according to a first coordinate and a second coordinate of position relative to the craft, means carried by the craft for varying the position of said first element scalarly with changes in position of the craft, means for varying the position of said second element according to a predetermined course of craft movement, link means extending from one element to the other, and means for varying the heading of the craft in accordance with changes of direction of said link means.

11. A craft guidance system comprising recording means having recorded thereon a reference A.-C. signal and first and second variable phase A.-C. signals, means responsive to the difference in phase at any instant of time between the reference signal and the first and second signals respectively, the respective phase differences at said instant defining first and second coordinates of a moving point toward which the craft is to be directed, means including radio position determining apparatus for defining a point corresponding to the craft's actual position, and means for controlling the flight of the aircraft according to the angle and magnitude of the vector between the actual position point and said moving point.

12. A craft guidance system for an airplane having an autopilot control and a directional gyro, said system comprising a first element movable universally in a plane, a second element movable universally in a plane parallel to the plane of movement of the first element, means for varying the position of said first element scalarly in response to variations in actual position of the craft, means for varying the position of the second element scalarly according to a predetermined course and program of craft movement, and means for maintaining a predetermined relation between the movements of said elements including a variable length link extending between the two elements and error signal generating means responsive to the difference in actual craft heading as indicated by the directional gyro and desired craft heading as indicated by the relative angle of said link, the autopilot being coupled to the error signal generating means for effecting a change in craft heading in response to the error signal.

13. A craft guidance system as defined in claim 12 wherein said means for maintaining agreement of movement between said elements further includes means for varying the speed of the aircraft in response to variations in the length of said link between the first and second elements.

14. An aircraft guidance system comprising recording means including a recording medium and reversible multi-speed means for driving the recording medium, said recording means being adapted to record a plurality of electrical signals simultaneously and reproduce a plurality of electrical signals simultaneously, receiving means coupled to the input of the recording means for receiving information in the form of electrical signals indicative of a predetermined flight path, plotting means including a first element universally movable in a plane, said plotting means being responsive to said received electrical signals as reproduced by the recording means, said first element being positioned in response to the electrical signals from said receiving means and tracing out to scale said predetermined flight path, a second element universally movable in a plane parallel to the plane of movement of said first element, means for positioning said second element scalarly with changes in position of the craft, and means including an extensible link between said first and second elements for signalling variations of the direction and speed of the craft according to the vector direction and distance between said elements.

15. The system as defined in claim 14 wherein said means for driving the recording medium operates at high speed when recording and low speed when subsequently reproducing the recording, the recording medium being driven in opposite directions when recording and when subsequently reproducing.

16. An aircraft guidance system comprising recording means adapted to record a plurality of electrical signals simultaneously and reproduce a plurality of electrical signals simultaneously, receiving means coupled to the input of the recording means for receiving information in the form of electrical signals indicative of a predetermined flight path, plotting means including a first element universally movable in a plane, means for varying the position of said plotting means in response to said received electrical signals as reproduced by the recording means, a second element universally movable in a plane parallel to the plane of movement of said first element, means for positioning said second element scalarly with changes in position of the craft, and means coupled to said first and second elements for varying the direction and speed of the craft according to the vector direction and distance between said elements.

References Cited in the file of this patent

UNITED STATES PATENTS

| | | |
|---|---|---|
| 2,224,182 | Crooke | Dec. 10, 1940 |
| 2,422,025 | Luck | June 10, 1947 |
| 2,472,129 | Streeter | June 7, 1949 |
| 2,526,682 | Mulberger et al. | Oct. 24, 1950 |
| 2,540,150 | Watts | Feb. 6, 1951 |
| 2,541,277 | Omberg et al. | Feb. 13, 1951 |
| 2,582,588 | Fennessy et al. | Jan. 15, 1952 |
| 2,610,226 | Klaasse et al. | Sept. 9, 1952 |
| 2,617,705 | Coombs et al. | Nov. 11, 1952 |
| 2,637,848 | Cunningham | May 5, 1953 |